United States Patent
Luo et al.

(10) Patent No.: US 10,045,285 B2
(45) Date of Patent: Aug. 7, 2018

(54) WIRELESS LOCAL AREA NETWORK ACCESS POINT SEARCH METHOD, APPARATUS, AND SYSTEM

(71) Applicant: HUAWEI TECHNOLOGIES CO., LTD., Shenzhen (CN)

(72) Inventors: Haiyan Luo, Shanghai (CN); Tianle Deng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/609,120

(22) Filed: May 31, 2017

(65) Prior Publication Data

US 2017/0265126 A1    Sep. 14, 2017

Related U.S. Application Data

(63) Continuation of application No. 14/751,394, filed on Jun. 26, 2015, now Pat. No. 9,699,714, which is a
(Continued)

(51) Int. Cl.
*H04W 48/16* (2009.01)
*H04W 48/20* (2009.01)
*H04W 84/12* (2009.01)

(52) U.S. Cl.
CPC ............ *H04W 48/16* (2013.01); *H04W 48/20* (2013.01); *H04W 84/12* (2013.01); *Y02D 70/00* (2018.01);
(Continued)

(58) Field of Classification Search
CPC .................................................... H04W 48/16
See application file for complete search history.

(56) References Cited

U.S. PATENT DOCUMENTS

2004/0165563 A1    8/2004  Hsu et al.
2007/0064655 A1    3/2007  Ruuska
(Continued)

FOREIGN PATENT DOCUMENTS

CN        101485228        7/2009
CN        101622826        1/2010
(Continued)

OTHER PUBLICATIONS

International Search Report dated Oct. 3, 2013 in corresponding International Patent Application No. PCT/CN2012/087592.
(Continued)

*Primary Examiner* — Ronald B Abelson
(74) *Attorney, Agent, or Firm* — Staas & Halsey LLP

(57) ABSTRACT

The present application discloses a wireless local area network access point search method, an apparatus, and a system, relates to the field of communications technologies, and can reduce power consumption for passive scanning. According to the method, beacon sending information of a wireless local area network access point and measurement information of a user equipment are matched, so that the user equipment can search for the wireless local area network access point only at the time when and a frequency channel number at which the wireless local area network access point sends a beacon. Compared with the prior art in which a user equipment needs to continuously keep a state of searching for a wireless local area network access point, the present application greatly shortens time spent by the user equipment in listening to a beacon, and therefore reduces power consumption of passive scanning.

19 Claims, 14 Drawing Sheets

Related U.S. Application Data continuation of application No. PCT/CN2012/087592, filed on Dec. 26, 2012.

(52) U.S. Cl.
 CPC ........ *Y02D 70/1262* (2018.01); *Y02D 70/142* (2018.01)

(56) References Cited

U.S. PATENT DOCUMENTS

| | | | |
|---|---|---|---|
| 2007/0258397 A1 | 11/2007 | Ho et al. | |
| 2008/0205340 A1 | 8/2008 | Meylan et al. | |
| 2010/0195595 A1 | 8/2010 | Iwata | |
| 2011/0075610 A1* | 3/2011 | Nakamura | H04W 48/16 370/328 |
| 2011/0106930 A1 | 5/2011 | Lee et al. | |
| 2011/0134746 A1* | 6/2011 | Liu | H04J 1/12 370/201 |
| 2011/0319086 A1* | 12/2011 | Katori | H04W 48/08 455/440 |
| 2012/0155439 A1 | 6/2012 | Marinier et al. | |

FOREIGN PATENT DOCUMENTS

| | | | |
|---|---|---|---|
| CN | 101772980 | 7/2010 | |
| CN | 101867979 | 10/2010 | |
| CN | 102598802 | 7/2012 | |
| JP | WO2012/137927 | * 10/2012 | ............ H04W 36/00 |
| WO | 2010/141152 | 12/2010 | |

OTHER PUBLICATIONS

Extended European Search Report dated Dec. 11, 2015 in corresponding European Patent Application No. 12890862.1.
Office Action dated Nov. 22, 2016 in related U.S. Appl. No. 14/751,394.
Notice of Allowance dated Mar. 1, 2017 in related U.S. Appl. No. 14/751,394.
U.S. Appl. No. 14/751,394, filed Jun. 26, 2015, Haiyan Luo et al., Huawei Technologies Co., Ltd.

\* cited by examiner

WIRELESS LOCAL AREA NETWORK ACCESS POINT SEARCH METHOD, APPARATUS, AND SYSTEM

CROSS-REFERENCE TO RELATED APPLICATIONS

This application is a continuation of U.S. application Ser. No. 14/751,394, filed on Jun. 26, 2015, pending, which is a continuation of International Application No. PCT/CN2012/087592, filed on Dec. 26, 2012, All of the afore-mentioned patent applications are hereby incorporated by reference in their entireties.

TECHNICAL FIELD

The present application relates to the field of communications technologies, and in particular, to a wireless local area network access point search method, an apparatus, and a system.

BACKGROUND

To access a wireless local area network (WLAN) a user equipment (UE) first needs to search for a WLAN. Searching for a WLAN includes active scanning and passive scanning. In the active scanning, the UE actively sends a probe request, and then if a WLAN access point (AP) returns a probe feedback (for example, a probe response), it indicates that the search is successful. In the passive scanning, a WLAN AP sends a beacon once at each beacon interval, and if the UE successfully receives the beacon, it indicates that the search is successful. After a WLAN AP is successfully found by means of active scanning or passive scanning, the UE may initiate a connection request (for example, an association request) to the found WLAN AP for connection.

In active scanning, it is assumed that a UE searches for a WLAN every 15 s, and there are 11 WLAN channels in total. The UE stays on each WLAN channel for approximately 5 ms, where 1 ms is used to send a probe request, and power consumption is approximately 250 mA*s and the remaining time is used to search for a probe feedback, and power consumption is approximately 60 mA. Power consumption consumed in other sleep time is approximately 180 µA*s. Therefore, it may be learned by calculation that total energy consumed by the UE within 15 s is 8.08 mA*s. In passive scanning, a UE is always in a process of searching for a probe feedback, and if a cycle of broadcasting a beacon by a WLAN AP is 1 s, in the worst situation, energy consumed within 1 s is 60 mA*s. Relatively speaking, power consumption for active scanning is less than that for passive scanning. However, in cases of some frequencies or in some scenarios, active scanning is prohibited. Therefore, how to reduce power consumption for passive scanning is a problem that needs to be resolved.

SUMMARY

Embodiments of the present application provide a wireless local area network access point search method, an apparatus, and a system, so as to reduce power consumption for passive scanning.

To achieve the foregoing objective, the following technical solutions are used in the embodiments of the present application:

According to a first aspect, the present application provides a wireless local area network access point search method, including:

acquiring, by a base station, measurement information, where the measurement information includes at least one of the following information: search time information, beacon sending time information, frequency information of a wireless local area network access point, and identifier information of the wireless local area network access point; and sending, by the base station, the measurement information to a user equipment served by the base station, where the measurement information is used by the user equipment to search for the wireless local area network access point.

With reference to the first aspect, in a first possible implementation manner, the search time information includes search duration, or includes search duration and a search cycle; and the beacon sending time information includes beacon sending time, or includes beacon sending time and a beacon sending cycle.

With reference to the first possible implementation manner of the first aspect, in a second possible implementation manner, the acquiring, by a base station, measurement information includes:

acquiring, by the base station, beacon sending information of the wireless local area network access point, and determining the measurement information according to the beacon sending information; or configuring, by the base station, the measurement information for the user equipment; or receiving, by the base station, the measurement information sent by a network device, where the network device is configured to manage collaborative work between the base station and the wireless local area network access point.

With reference to the second possible implementation manner of the first aspect, in a third possible implementation manner, the measurement information sent by the network device includes: measurement information configured for the user equipment by the network device, or measurement information that is of the user equipment and determined by the network device according to the beacon sending information of the wireless local area network access point.

With reference to the second possible implementation manner of the first aspect, in a fourth possible implementation manner, the acquiring, by the base station, beacon sending information of the wireless local area network access point includes:

configuring, by the base station, the beacon sending information for the wireless local area network access point; or receiving, by the base station, the beacon sending information sent by the wireless local area network access point; or receiving, by the base station, the beacon sending information sent by the network device.

With reference to the fourth possible implementation manner of the first aspect, in a fifth possible implementation manner, the beacon sending information sent by the network device includes: beacon sending information sent by the wireless local area network access point to the network device, or beacon sending information configured for the wireless local area network access point by the network device.

With reference to the fourth possible implementation manner of the first aspect, in a sixth possible implementation manner, after the configuring, by the base station, the beacon sending information for the wireless local area network access point, the method further includes:

sending, by the base station, the beacon sending information to the wireless local area network access point, so that the wireless local area network access point sends a beacon according to the beacon sending information.

With reference to the sixth possible implementation manner of the first aspect, in a seventh possible implementation manner, the sending, by the base station, the beacon sending information to the wireless local area network access point includes:

sending, by the base station, the beacon sending information to the wireless local area network access point; or sending, by the base station, the beacon sending information to the network device, and sending, by the network device, the beacon sending information to the wireless local area network access point.

With reference to any one of the fourth to seventh possible implementation manners of the first aspect, in an eighth possible implementation manner, the beacon sending information includes the beacon sending time information, or includes the beacon sending time information and the frequency information.

With reference to any one of the second to eighth possible implementation manners of the first aspect, in a ninth possible implementation manner, the method further includes:

transparently transmitting, by the base station to the user equipment, the measurement information sent from the network device to the user equipment, where:

the measurement information transparently transmitted from the network device to the user equipment includes: the measurement information configured for the user equipment by the network device, or the measurement information that is of the user equipment and determined by the network device according to the beacon sending information of the wireless local area network access point.

With reference to the first aspect, or the first nine possible implementation manners of the first aspect, in a tenth possible implementation manner, the method further includes:

sending, by the base station, measurement indication information to the user equipment; or transparently transmitting, by the base station to the user equipment, measurement indication information sent by the network device, so that the user equipment that receives the measurement indication information searches for the wireless local area network access point according to the stored measurement information.

According to a second aspect, the present application provides a wireless local area network access point search method, including:

acquiring, by a user equipment, measurement information, where the measurement information includes at least one of the following information: search time information, beacon sending time information, frequency information of a wireless local area network access point, and identifier information of the wireless local area network access point; and searching, by the user equipment, for the wireless local area network access point according to the measurement information.

With reference to the second aspect, in a first possible implementation manner, the search time information includes search duration, or includes search duration and a search cycle; and the beacon sending time information includes beacon sending time, or includes beacon sending time and a beacon sending cycle.

With reference to the first possible implementation manner of the second aspect, in a second possible implementation manner, the acquiring, by a user equipment, measurement information includes:

receiving, by the user equipment, the measurement information sent by a base station; or receiving, by the user equipment, the measurement information sent from a network device and transparently transmitted by a base station, where the network device is configured to manage collaborative work between the base station and the wireless local area network access point.

With reference to the second aspect and the first two possible implementation manners of the second aspect, in a third possible implementation manner, the method further includes:

when receiving measurement indication information sent by the base station or receiving the measurement information sent from the network device and transparently transmitted by the base station, searching, by the user equipment, for the wireless local area network access point according to the stored measurement information.

According to a third aspect, the present application provides a wireless local area network access point search method, including:

acquiring, by a wireless local area network access point, beacon sending information; and sending, by the wireless local area network access point, a beacon according to the beacon sending information.

With reference to the third aspect, in a first possible implementation manner, the beacon sending information includes beacon sending time information, or includes beacon sending time information and frequency information; and the beacon sending time information includes beacon sending time, or includes beacon sending time and a beacon sending cycle.

With reference to the first possible implementation manner of the third aspect, in a second possible implementation manner, the acquiring, by a wireless local area network access point, beacon sending information includes:

configuring, by the wireless local area network access point, the beacon sending information for the wireless local area network access point; or receiving, by the wireless local area network access point, the beacon sending information sent by a base station; or receiving, by the wireless local area network access point, the beacon sending information sent by a network device, where the network device is configured to manage collaborative work between a base station and the wireless local area network access point.

With reference to the second possible implementation manner of the third aspect, in a third possible implementation manner, the beacon sending information sent by the network device includes: beacon sending information sent by the base station to the network device, or beacon sending information configured for the wireless local area network access point by the network device.

With reference to the third possible implementation manner of the third aspect, in a fourth possible implementation manner, after the configuring, by the wireless local area network access point, the beacon sending information for the wireless local area network access point, the method further includes:

sending, by the wireless local area network access point, the beacon sending information to the base station; or sending, by the wireless local area network access point, the beacon sending information to the network device, and sending, by the network device, the beacon sending information to the base station; or sending, by the wireless local area network access point, the beacon sending information to the network device; determining, by the network device, measurement information according to the beacon sending information, and sending the measurement information to the base station; and sending, by the base station, the measurement information to the user equipment; or sending, by the wireless local area network access point, the beacon sending information to the network device; determining, by the network device, measurement information according to the beacon sending information, and transparently transmitting the measurement information to the user equipment by using the base station; or According to a fourth aspect, the present application provides a wireless local area network access point search method, including:

acquiring, by a network device, measurement information, where the measurement information includes at least one of the following information: search time information, beacon sending time information, frequency information of a wireless local area network access point, and identifier information of the wireless local area network access point; and sending, by the network device, the measurement information to a user equipment, where the measurement information is used by the user equipment to search for the wireless local area network access point, and the user equipment is served by a base station managed by the network device.

With reference to the fourth aspect, in a first possible implementation manner, the search time information includes search duration, or includes search duration and a search cycle; and the beacon sending time information includes beacon sending time, or includes beacon sending time and a beacon sending cycle.

With reference to the first possible implementation manner of the fourth aspect, in a second possible implementation manner, the sending the measurement information to a user equipment includes:

sending the measurement information to the base station, so that the base station sends the measurement information to the user equipment; or transparently transmitting the measurement information to the user equipment by using the base station.

According to a fifth aspect, the present application provides a base station, including:

an acquiring unit, configured to acquire measurement information, where the measurement information includes at least one of the following information: search time information, beacon sending time information, frequency information of a wireless local area network access point, and identifier information of the wireless local area network access point; and a sending unit, configured to send the measurement information acquired by the acquiring unit to a user equipment, where the measurement information is used by the user equipment to search for the wireless local area network access point, and the user equipment is served by the base station.

With reference to the fifth aspect, in a first possible implementation manner, the search time information includes search duration, or includes search duration and a search cycle; and the beacon sending time information includes beacon sending time, or includes beacon sending time and a beacon sending cycle.

With reference to the first possible implementation manner of the fifth aspect, in a second possible implementation manner, the acquiring unit is specifically configured to acquire beacon sending information of the wireless local area network access point, and determine the measurement information according to the beacon sending information; is further configured to configure the measurement information for the user equipment; and is further configured to receive the measurement information sent by a network device, where the network device is configured to manage collaborative work between the base station and the wireless local area network access point.

With reference to the second possible implementation manner of the fifth aspect, in a third possible implementation manner, the measurement information sent by the network device includes: measurement information configured for the user equipment by the network device, or measurement information that is of the user equipment and determined by the network device according to the beacon sending information of the wireless local area network access point.

With reference to the third possible implementation manner of the fifth aspect, in a fourth possible implementation manner, the acquiring unit is further configured to configure the beacon sending information for the wireless local area network access point; or further configured to receive the beacon sending information sent by the wireless local area network access point; or further configured to receive the beacon sending information sent by the network device.

With reference to the fourth possible implementation manner of the fifth aspect, in a fifth possible implementation manner, the beacon sending information sent by the network device includes: beacon sending information sent by the wireless local area network access point to the network device, or beacon sending information configured for the wireless local area network access point by the network device.

With reference to the fifth possible implementation manner of the fifth aspect, in a sixth possible implementation manner, the sending unit is further configured to send the beacon sending information to the wireless local area network access point, so that the wireless local area network access point sends a beacon according to the beacon sending information.

With reference to the sixth possible implementation manner of the fifth aspect, in a seventh possible implementation manner, the sending unit is further configured to send the beacon sending information to the wireless local area network access point; or configured to send the beacon sending information to the network device, and then the network device sends the beacon sending information to the wireless local area network access point.

With reference to any one of the fourth to seventh possible implementation manners of the fifth aspect, in an eighth possible implementation manner, the beacon sending information includes the beacon sending time information, or includes the beacon sending time information and the frequency information.

With reference to the second to eighth possible implementation manners of the fifth aspect, in a ninth possible implementation manner, the sending unit is further configured to transparently transmit, to the user equipment, the measurement information sent from the network device to the user equipment, where:

the measurement information transparently transmitted from the network device to the user equipment includes: the measurement information configured for the user equipment by the network device, or the measurement information that is of the user equipment and determined by the network device according to the beacon sending information of the wireless local area network access point.

With reference to the ninth possible implementation manner of the fifth aspect, in a tenth possible implementation manner, the sending unit is further configured to send measurement indication information to the user equipment; or configured to transparently transmit, to the user equipment, the measurement indication information sent from the network device to the user equipment, so that the user equipment that receives the measurement indication information searches for the wireless local area network access point according to the stored measurement information.

In a sixth aspect, the present application provides a user equipment, including:

an acquiring unit, configured to acquire measurement information, where the measurement information includes at least one of the following information: search time information, beacon sending time information, frequency information of a wireless local area network access point, and identifier information of the wireless local area network access point; and a search unit, configured to search for the wireless local area network access point according to the measurement information acquired by the acquiring unit.

With reference to the sixth aspect, in a first possible implementation manner, the search time information includes search duration, or includes search duration and a search cycle; and the beacon sending time information includes beacon sending time, or includes beacon sending time and a beacon sending cycle.

With reference to the first possible implementation manner of the sixth aspect, in a second possible implementation manner, the acquiring unit is configured to receive the measurement information sent by a base station; or further configured to receive the measurement information sent by a network device and transparently transmitted by a base station, where the network device is configured to manage collaborative work between the base station and the wireless local area network access point.

With reference to the sixth aspect and the first two possible implementation manners of the sixth aspect, in a third possible implementation manner, the search unit is further configured to: when receiving measurement indication information sent by the base station or receiving the measurement information sent from the network device and transparently transmitted by the base station, search for the wireless local area network access point according to the stored measurement information.

According to a seventh aspect, the present application provides a wireless local area network access point, including:

an acquiring unit, configured to acquire beacon sending information; and a sending unit, configured to send a beacon according to the beacon sending information acquired by the acquiring unit.

With reference to the seventh aspect, in a first possible implementation manner, the beacon sending information includes beacon sending time information, or includes beacon sending time information and frequency information; and the beacon sending time information includes beacon sending time, or includes beacon sending time and a beacon sending cycle.

With reference to the first possible implementation manner of the seventh aspect, in a second possible implementation manner, the acquiring unit is specifically configured to configure the beacon sending information for the wireless local area network access point; further configured to receive the beacon sending information sent by a base station; and further configured to receive the beacon sending information sent by a network device, where the network device is configured to manage collaborative work between the base station and the wireless local area network access point.

With reference to the second possible implementation manner of the seventh aspect, in a third possible implementation manner, the beacon sending information sent by the network device includes: beacon sending information sent by the base station to the network device, or beacon sending information configured for the wireless local area network access point by the network device.

With reference to the third possible implementation manner of the seventh aspect, in a fourth possible implementation manner, the wireless local area network access point further includes:

a sending unit, configured to send the beacon sending information to the base station; further configured to send the beacon sending information to the network device, so that the network device sends the beacon sending information to the base station; further configured to send the beacon sending information to the network device, so that the network device determines measurement information according to the beacon sending information, and sends the measurement information to the base station, and the base station sends the measurement information to the user equipment; or configured to send the beacon sending information to the network device, so that the network device determines measurement information according to the beacon sending information, and uses the base station to transparently transmit the measurement information to the user equipment.

According to an eighth aspect, the present application provides a network device, including:

an acquiring unit, configured to acquire measurement information, where the measurement information includes at least one of the following information: search time information, beacon sending time information, frequency information of a wireless local area network access point, and identifier information of the wireless local area network access point; and a sending unit, configured to send the measurement information acquired by the acquiring unit to a user equipment, where the measurement information is used by the user equipment to search for the wireless local area network access point, and the user equipment is served by a base station managed by the network device.

With reference to the eighth aspect, in a first possible implementation manner, the search time information includes search duration, or includes search duration and a search cycle; and the beacon sending time information includes beacon sending time, or includes beacon sending time and a beacon sending cycle.

With reference to the first possible implementation manner of the eighth aspect, in a second possible implementation manner, the sending unit is specifically configured to send the measurement information to the base station, so that the base station sends the measurement information to the user equipment; or further configured to transparently transmit the measurement information to the user equipment by using the base station.

According to a ninth aspect, the present application provides a wireless local area network access point search system, including the base station according to the fifth aspect, the user equipment according to the sixth aspect, the wireless local area network access point according to the seventh aspect, and the network device according to the eighth aspect.

According to the wireless local area network access point search method, apparatus, and system provided in the embodiments of the present application, beacon sending information of a wireless local area network access point and measurement information of a user equipment are matched, so that the user equipment can search for the wireless local area network access point only at the time when and a frequency channel number at which the wireless local area network access point sends a beacon. Compared with the prior art in which a user equipment needs to continuously keep a state of searching for a wireless local area network access point, the present application greatly shortens time spent by the user equipment in listening to a beacon, and therefore reduces power consumption of passive scanning.

BRIEF DESCRIPTION OF DRAWINGS

To describe the technical solutions in the embodiments of the present application more clearly, the following briefly introduces the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

Figure 1:
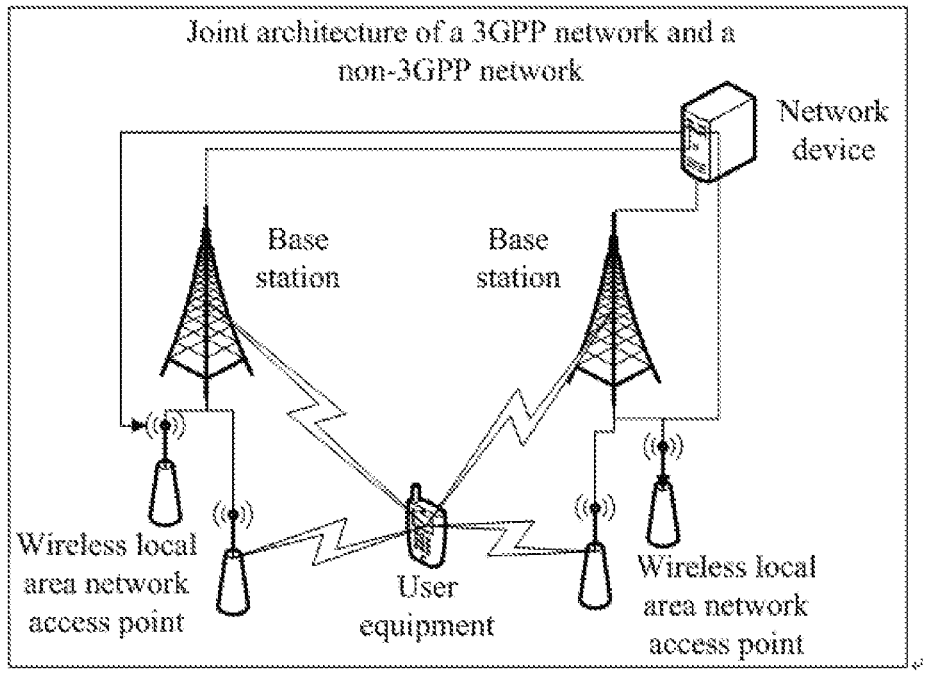
FIG. 1 is a composition block diagram of a joint architecture of a 3GPP network and a non-3GPP network according to an embodiment of the present application.

The embodiments of the present application provide a wireless local area network access point search method, which may be applied to a joint architecture of a 3GPP network and a non-3GPP network shown in FIG. 1. The architecture includes several base stations and several wireless local area network access points in coverage of a cell served by each base station. All the base stations and the wireless local area network access points can communicate with a user equipment; however, the base station communicates with the user equipment by using an LTE network, and the wireless local area network access point communicates with the user equipment by using a WLAN. A network device, for example, a radio network controller (Radio Network Controller, RNC), an access network discovery and selection function (Access Network Discovery and Selection Function, ANDSF) node, or another device, may further be disposed based on the joint architecture of the 3GPP network and the non-3GPP network. These devices may be disposed on a core network, or may be disposed on an access network, so as to provide management and control services for collaborative work between the base stations and the wireless local area network access points. The network device in the embodiments of the present application refers to a device configured to manage collaborative work between a base station and a wireless local area network access point.

The base station and the wireless local area network access point are of different standards, which refers to that a network used for communication between the base station and the user equipment and a network used for communication between the wireless local area network access point and the user equipment are of different standards. In the embodiments, the network used for communication between the base station and the user equipment is a 3GPP network, for example, LTE; and the network used for communication between the wireless local area network access point and the user equipment is a WLAN.

Figure 2:
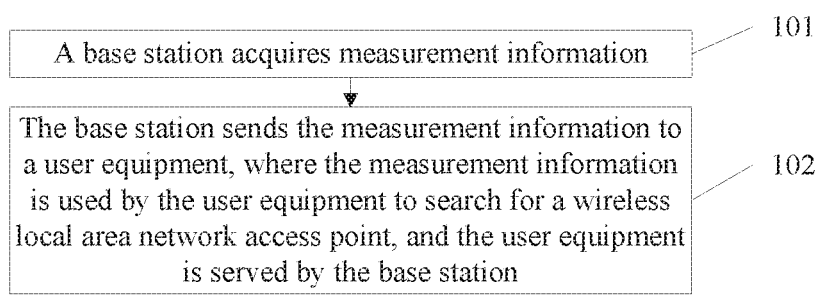
FIG. 2 is a flowchart of a wireless local area network access point search method according to an embodiment of the present application.

Based on the network architecture shown in FIG. 1, an embodiment of the present application provides a wireless local area network access point search method, which is implemented by a base station. As shown in FIG. 2, the method includes the following content:

101: The base station acquires measurement information.

The measurement information is used by a user equipment served by the base station to search for a wireless local area network access point.

The measurement information includes at least one of the following information: search time information, beacon sending time information, frequency information of the wireless local area network access point, and identifier information of the wireless local area network access point. It should be noted that, in the preceding measurement information, only one can be selected from the search time information and the beacon sending time information. That is, the measurement information does not necessarily include both the search time information and the beacon sending time information. No limitation is imposed on other information. For example, the measurement information may include the search time information and identifier information of the wireless local area network access point, or include the beacon sending time information and the frequency information of the wireless local area network access point.

In the foregoing measurement information, the search time information includes search duration, or includes search duration and a search cycle; and the beacon sending time information includes beacon sending time, or includes beacon sending time and a beacon sending cycle. The beacon sending time refers to time taken by a wireless local area network access point to send a beacon to a user equipment in coverage of the wireless local area network access point, which may be a time point, or may be a period of time with a small variation based on a time point. After listening to a beacon of a wireless local area network access point within one beacon sending time, the user equipment can initiate establishment of a wireless connection to the wireless local area network access point.

It should be noted that, in the foregoing embodiment, the base station acquires measurement information may be implemented by using any one of the following implementation manners 1 to 3.

Implementation manner 1: The base station acquires beacon sending information of the wireless local area network access point, and determines the measurement information according to the beacon sending information.

Implementation manner 2: The base station configures the measurement information for the user equipment.

Implementation manner 3: The base station receives the measurement information sent by a network device.

In the implementation manner 1, the beacon sending information includes the beacon sending time information, or includes the beacon sending time information and the frequency information, the search time information in the measurement information is corresponding to the beacon sending time information in the beacon sending information, the search duration in the search time information is corresponding to the beacon sending time in the beacon sending time information, and the search cycle in the search time information is corresponding to a beacon broadcasting cycle in the beacon sending time information. It is assumed that the base station and the wireless local area network access point are synchronized in time. From a perspective of a value, the foregoing each pair of parameters is the same or has a fixed time difference.

In addition, in this embodiment, an implementation method of acquiring, by the base station, the beacon sending information of the wireless local area network access point and determining the measurement information according to the beacon sending information is that: converting the beacon sending information that can be identified by the wireless local area network access point into the measurement information that can be identified by the user equipment. In this process, one of corresponding measurement information may be separately determined for beacon sending information of each wireless local area network access point, and each measurement information is separately sent to the user equipment; or one of measurement information may be generated by integrating beacon sending information of all wireless local area network access points, and the one of measurement information is sent to the user equipment.

Identifier information of the wireless local area network access point may include a basic service set identifier (Basic Service Set Identifier, BSSID) and a service set identifier (Service Set Identifier, SSID), where the BSSID is a Medium Access Control (Medium Access Control, MAC) address of the wireless local area network access point, and one BSSID is uniquely corresponding to one wireless local area network access point; and the SSID is a name of a configurable network, for example, the SSID may be a name of a local area network, and multiple wireless local area network access points on a configurable network such as the local area network may all be identified by using a same SSID, that is, one SSID may be corresponding to multiple wireless local area network access points.

It should be noted herein that, because all parameters included in the measurement information are corresponding to parameters in the beacon sending information, generally the number of parameters included in the measurement information is not greater than the number of parameters in the beacon sending information. For example, if the beacon sending information includes the frequency information, the beacon sending time and the beacon sending cycle, the measurement information may include the frequency information, the search duration and the search cycle. Certainly, according to an actual requirement, it can be that the measurement information includes any one or more parameters. However, to reduce as much power consumption as possible on a user equipment side, the measurement information generally includes all parameters that may be used by the user equipment in this embodiment.

In the implementation manner 2, configuration of the measurement information is not independent. In a process of configuring the measurement information, the base station further needs to set corresponding beacon sending information, so that the wireless local area network access point performs beacon broadcasting according to the beacon sending information corresponding to the measurement information received by the user equipment. Only in this way an objective of reducing power consumption for passive scanning of a user equipment can be achieved in the present application.

In the implementation manner 3, the measurement information sent by the network device is measurement information configured for the user equipment by the network device, or the measurement information sent by the network device is measurement information that is of the user equipment and determined by the network device according to the beacon sending information of the wireless local area network access point.

Further, it should be noted that, in the foregoing implementation manner 1, the base station acquires the beacon sending information of the wireless local area network access point may be specifically implemented by using any one of the following implementation manners 4 to 6, including:

Implementation manner 4: The base station configures the beacon sending information for the wireless local area network access point.

Implementation manner 5: The base station receives the beacon sending information sent by the wireless local area network access point.

Implementation manner 6: The base station receives the beacon sending information sent by the network device.

In implementation manners 4 to 6, descriptions related to the beacon sending information are the same as that in the implementation manner 1.

In the implementation manner 4, in the process of configuring the beacon sending information for the wireless local area network access point, the base station needs to configure all wireless local area network access points to send respective beacons at different frequency channel numbers and different time points. For example, different beacon sending time and different frequency information may be configured for wireless local area network access points; or a same beacon sending cycle, different beacon sending time, and different frequency information may be configured for wireless local area network access points; or different beacon sending cycles, different beacon sending time, and different frequency information may be configured for wireless local area network access points. However, that different wireless local area network access points send beacons at the same time needs to be avoided as much as possible.

In the implementation manner 6, the beacon sending information sent by the network device includes: beacon sending information sent by the wireless local area network access point to the network device, or beacon sending information configured for the wireless local area network access point by the network device.

It should be noted that, when the implementation manner 4 is used to acquire the beacon sending information of the wireless local area network access point, after the implementation manner 4 is executed, the base station sends the beacon sending information to the wireless local area network access point, so that the wireless local area network access point sends a beacon according to the beacon sending information. This step may be implemented by using any one of the following two implementation manners 7 and 8, including:

Implementation manner 7: The base station directly sends the beacon sending information to the wireless local area network access point.

Implementation manner 8: The base station sends the beacon sending information to the network device, and the network device sends the beacon sending information to the wireless local area network access point.

102: The base station sends the measurement information to a user equipment.

That the base station sends the measurement information to a user equipment may be implemented by using any one of the following two implementation manners 9 and 10, including:

Implementation manner 9: The base station sends, by means of broadcasting, the measurement information to the user equipment in coverage of a cell served by the base station.

Implementation manner 10: The base station sends, by using radio resource control (Radio Resource Control, RRC) signaling, the measurement information to the user equipment in coverage of a cell served by the base station.

It should be noted that, in the implementation manner 9, the base station may send the measurement information to a user equipment that is in an idle state and/or in a connected state. However, in the implementation manner 10, the base station can send the measurement information only to a user equipment that is in a connected state.

In addition, it should be noted that the technical solution recorded in the steps 101 and 102 is only that the base station sends the measurement information to the user equipment. Generally, the user equipment may directly search for a wireless local area network access point according to the information. However, in a special case, the user equipment may also store the measurement information, and does not execute a process of searching for a wireless local area network access point. In this case, the base station may further proactively send measurement indication information to the user equipment or transparently transmit, to the user equipment, measurement indication information sent by a network device, so that the user equipment that receives the measurement indication information searches for the wireless local area network access point according to the stored measurement information.

Further, it should be noted that, if the network device sends the measurement information to the user equipment, the base station needs to transparently transmit, to the user equipment, the measurement information sent from the network device to the user equipment. In this transparent transmission process, the base station has only a forwarding function, and does not identify or acquire specific content of the measurement information. That is, in this case, the base station cannot acquire the measurement information. In addition, the measurement information transparently transmitted from the network device to the user equipment includes: measurement information configured for the user equipment by the network device, or measurement information that is of the user equipment and determined by the network device according to the beacon sending information of the wireless local area network access point.

According to the wireless local area network access point search method provided in this embodiment of the present application, beacon sending information of a wireless local area network access point and measurement information of a user equipment are matched, so that the user equipment can search for the wireless local area network access point only at the time when a frequency channel number at which the wireless local area network access point sends a beacon. Compared with the prior art in which a user equipment needs to continuously keep a state of searching for a wireless local area network access point, the present application greatly shortens time spent by the user equipment in listening to a beacon, and therefore reduces power consumption for passive scanning.

Figure 3:
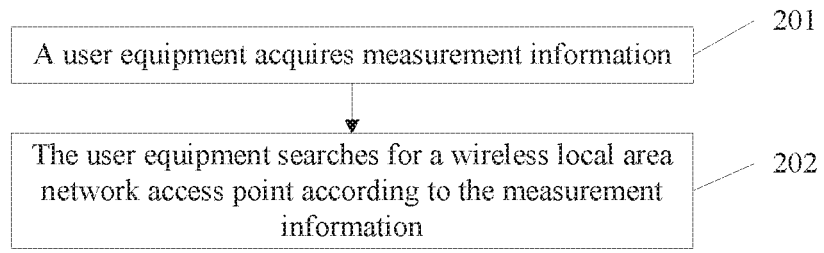
FIG. 3 is a flowchart of another wireless local area network access point search method according to an embodiment of the present application.

Based on the network architecture shown in FIG. 1, an embodiment of the present application provides a wireless local area network access point search method, which is implemented by a user equipment. As shown in FIG. 3, the method includes:

201: A user equipment acquires measurement information.

Descriptions related to the measurement information are the same as that in step 101.

That a user equipment acquires measurement information may be implemented by using the following implementation manner 11 or 12, specifically including:

Implementation manner 11: The user equipment receives the measurement information sent by a base station.

Implementation manner 12: The user equipment receives the measurement information sent by a network device and transparently transmitted by a base station.

The measurement information herein is the same as the measurement information described in the process executed on a base station side.

202: The user equipment searches for a wireless local area network access point according to the measurement information.

The user equipment may search for a wireless local area network access point according to different measurement information and in different manners. For example, when the measurement information is search time information, a wireless local area network access point is searched for at time indicated in the search time information; when the measurement information is beacon sending time information, a wireless local area network access point is searched for at time indicated in the beacon sending time information; when the measurement information is frequency information of a wireless local area network access point, the wireless local area network access point is searched for at a frequency channel number indicated in the frequency information of the wireless local area network access point; and when the measurement information is identifier information of a wireless local area network access point, the wireless local area network access point corresponding to the identifier information is searched for.

Further, when the search time information includes only search duration, the user equipment searches for a wireless local area network access point in the search duration; and when the search time information further includes a search cycle, the user equipment searches for a wireless local area network access point in search duration of each search cycle. However, because the user equipment needs to perform searching in each search cycle, to reduce power consumption for searching, when one or more wireless local area network access points are found in one search duration in the measurement information, the user equipment stops searching for a wireless local area network access point in the one search duration in a subsequent cycle following the current search cycle, and continues to search for a wireless local area network access point in remaining periods of search duration in the subsequent cycle following the current search cycle, where the remaining search durations are remaining search durations except the one search duration in the measurement information.

When storing the measurement information, the user equipment may use the measurement information table shown in Table 1.

TABLE 1

| Measurement information | | | |
|---|---|---|---|
| Frequency information | Identifier information | Search duration | Search cycle |
| f1 | BSSID1 | T1 | P1 |
|  | BSSID2 | T2 | P2 |
| f2 | BSSID1 | T3 | P3 |
|  | BSSID3 | T4 | P4 |
|  | BSSID4 | T5 | P5 | f1 and f2 are two different working frequency channel numbers of a wireless local area network access point. BSSID1 and BSSID2 have correspondences with f1, which indicates that two wireless local area network access points, whose identifier information is BSSID1 and BSSID2 respectively, can be found at the frequency channel number f1. BSSID1, BSSID3 and BSSID4 have correspondences with f2, which indicates that three wireless local area network access points, whose identifier information is BSSID1, BSSID3 and BSSID4 respectively, can be found at the frequency channel number f2. T1 to T5 are five different search durations, and P1 to P5 are five different search cycles.

In addition, when the receiving measurement indication information sent by the base station or receiving the measurement information sent from the network device and transparently transmitted by the base station, the user equipment searches for the wireless local area network access point according to the stored measurement information.

According to the wireless local area network access point search method provided in the embodiment of the present application, measurement information of a user equipment and beacon sending information of a wireless local area network access point are matched, so that the user equipment can search for the wireless local area network access point only at the time when and a frequency at which the wireless local area network access point sends a beacon. Compared with the prior art in which a user equipment needs to continuously keep a state of searching for a wireless local area network access point, the present application greatly shortens time spent by the user equipment in listening to a beacon, and therefore reduces power consumption for passive scanning.

Figure 4:
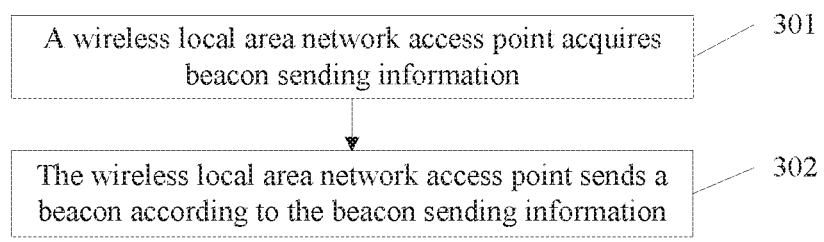
FIG. 4 is a flowchart of another wireless local area network access point search method according to an embodiment of the present application.

Based on the network architecture shown in FIG. 1, an embodiment of the present application provides a wireless local area network access point search method, which is implemented by a wireless local area network access point. As shown in FIG. 4, the method includes:

301: The wireless local area network access point acquires beacon sending information.

Descriptions related to the beacon sending information are the same as that in step 101.

That a wireless local area network access point acquires beacon sending information may be implemented by using any one of the following implementation manners 13 to 15, specifically including:

Implementation manner 13: The wireless local area network access point configures the beacon sending information for the wireless local area network access point.

Implementation manner 14: The wireless local area network access point receives the beacon sending information sent by a base station.

Implementation manner 15: The wireless local area network access point receives the beacon sending information sent by a network device.

In the implementation manner 15, the beacon sending information sent by the network device is beacon sending information sent by the base station to the network device; or the beacon sending information sent by the network device is beacon sending information configured for the wireless local area network access point by the network device.

After acquiring the beacon sending information by using the implementation manner 13, the wireless local area network access point sends the beacon sending information to the base station, or sends the beacon sending information to the network device. After receiving the beacon sending information sent by the wireless local area network access point, the network device may send the beacon sending information to the base station; or determines measurement information according to the beacon sending information, and sends the measurement information to the base station, and the base station sends the measurement information to a user equipment; or determines measurement information according to beacon sending information, and uses the base station to transparently transmit the measurement information to a user equipment.

302: The wireless local area network access point sends a beacon according to the beacon sending information.

According to the wireless local area network access point search method provided in the embodiment of the present application, in order to ensure that a user equipment can search for a wireless local area network access point only at the time when and a frequency channel number at which the wireless local area network access point sends a beacon, the wireless local area network access point needs to send the beacon according to acquired specific beacon sending information. Compared with the prior art in which a user equipment needs to continuously keep a state of searching for a wireless local area network access point, the present application greatly shortens time spent by the user equipment in listening to a beacon, and therefore reduces power consumption for passive scanning.

Figure 5:
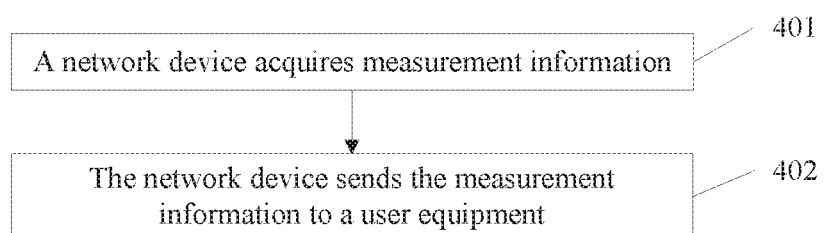
FIG. 5 is a flowchart of another wireless local area network access point search method according to an embodiment of the present application.

Based on the network architecture shown in FIG. 1, an embodiment of the present application provides a wireless local area network access point search method, which is implemented by a network device. As shown in FIG. 5, the method includes:

401: The network device acquires measurement information, where the measurement information is used by a user equipment to search for a wireless local area network access point, and the user equipment is served by a base station managed by the network device.

Descriptions related to the measurement information are the same as that in step 101.

402: The network device sends the measurement information to the user equipment.

That the network device sends the measurement information to the user equipment may be implemented by using any one of the following two implementation manners 16 and 17, specifically including:

Implementation manner 16: Send the measurement information to the base station, so that the base station sends the measurement information to the user equipment.

Implementation manner 17: Transparently transmit the measurement information to the user equipment by using the base station.

According to the wireless local area network access point search method provided in the embodiment of the present application, beacon sending information of a wireless local area network access point and measurement information of a user equipment are matched, so that the user equipment can search for the wireless local area network access point only at the time when and a frequency channel number at which the wireless local area network access point sends a beacon. Compared with the prior art in which a user equipment needs to continuously keep a state of searching for a wireless local area network access point, the present application greatly shortens time spent by the user equipment in listening to a beacon, and therefore reduces power consumption for passive scanning.

With reference to the foregoing technical steps describing a base station side, a wireless local area network access point side, a user equipment side, and a network device side, wireless local area network access point search methods provided in the present application are specifically described by using nine possible method processes shown in FIG. 6 to FIG. 14 as examples.

Figure 6:
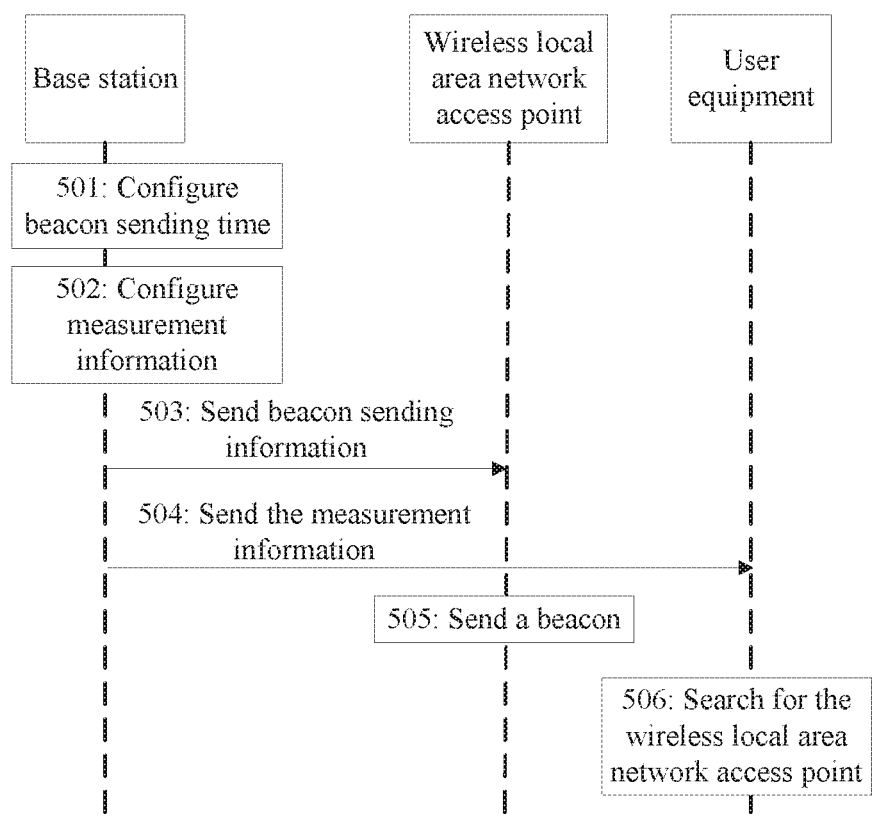
FIG. 6 is a flowchart of another wireless local area network access point search method according to an embodiment of the present application.

The method shown in FIG. 6 includes:

501: A base station configures beacon sending information for a wireless local area network access point.

502: The base station configures measurement information for a user equipment.

503: The base station sends the beacon sending information to the wireless local area network access point.

504: The base station sends the measurement information to the user equipment.

505: After receiving the beacon sending information, the wireless local area network access point sends a beacon according to the beacon sending information.

506: After receiving the measurement information, the user equipment searches for the wireless local area network access point according to the measurement information.

Figure 7:
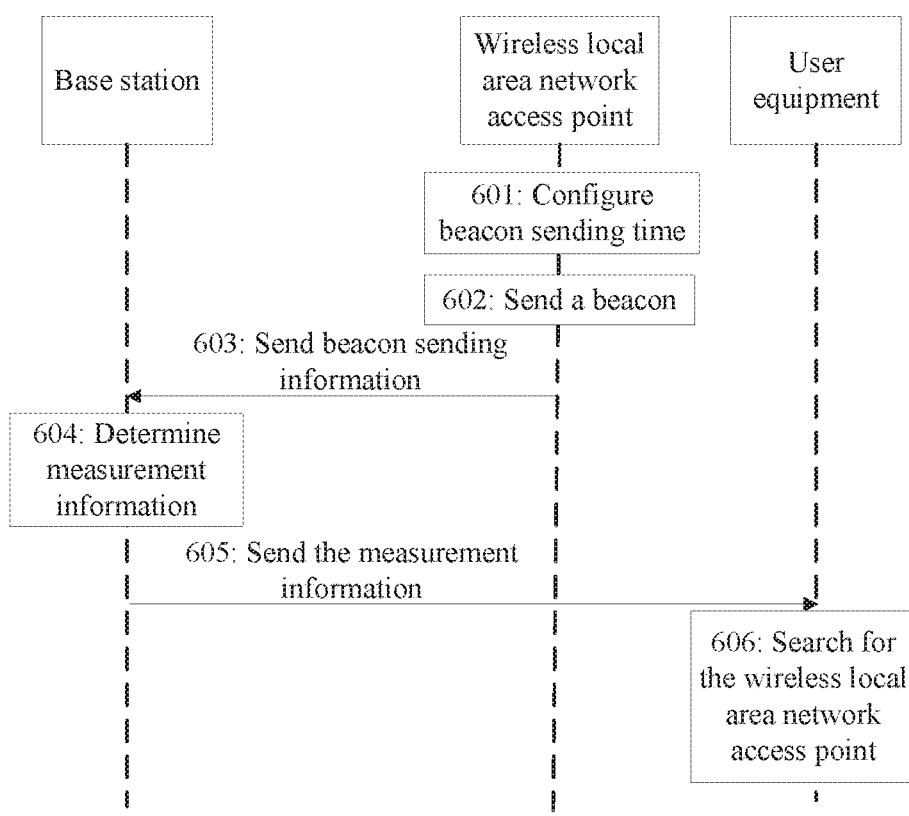
FIG. 7 is a flowchart of another wireless local area network access point search method according to an embodiment of the present application.

The method shown in FIG. 7 includes:

601: A wireless local area network access point configures beacon sending information for the wireless local area network access point.

602: The wireless local area network access point sends a beacon according to the beacon sending information.

603: The wireless local area network access point sends the beacon sending information to a base station.

604: After receiving the beacon sending information, the base station determines measurement information according to the beacon sending information.

605: The base station sends the measurement information to a user equipment.

606: After receiving the measurement information, the user equipment searches for the wireless local area network access point according to the measurement information.

Figure 8:
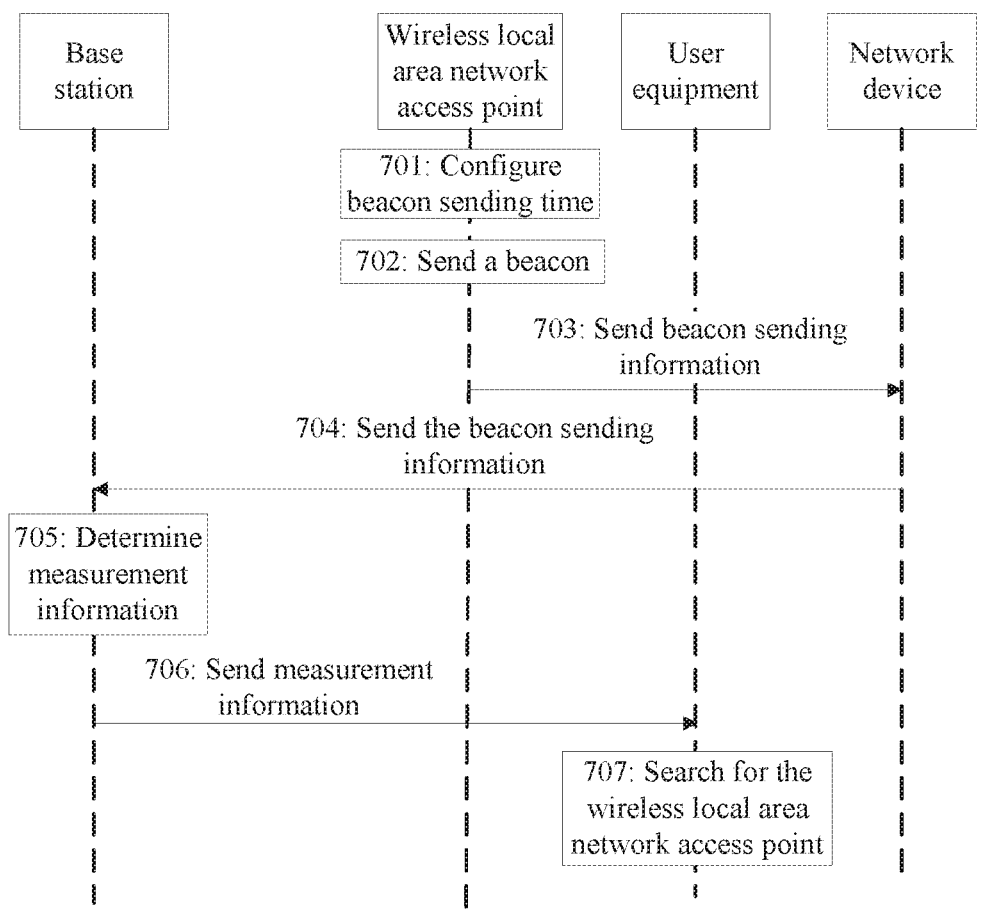
FIG. 8 is a flowchart of another wireless local area network access point search method according to an embodiment of the present application.

The method shown in FIG. 8 includes:

701: A wireless local area network access point configures beacon sending information for the wireless local area network access point.

702: The wireless local area network access point sends a beacon according to the beacon sending information.

703: The wireless local area network access point sends the beacon sending information to a network device.

704: After receiving the beacon sending information, the network device sends the beacon sending information to a base station.

705: After receiving the beacon sending information, the base station determines measurement information according to the beacon sending information.

706: The base station sends the measurement information to a user equipment.

707: After receiving the measurement information, the user equipment searches for the wireless local area network access point according to the measurement information.

Figure 9:
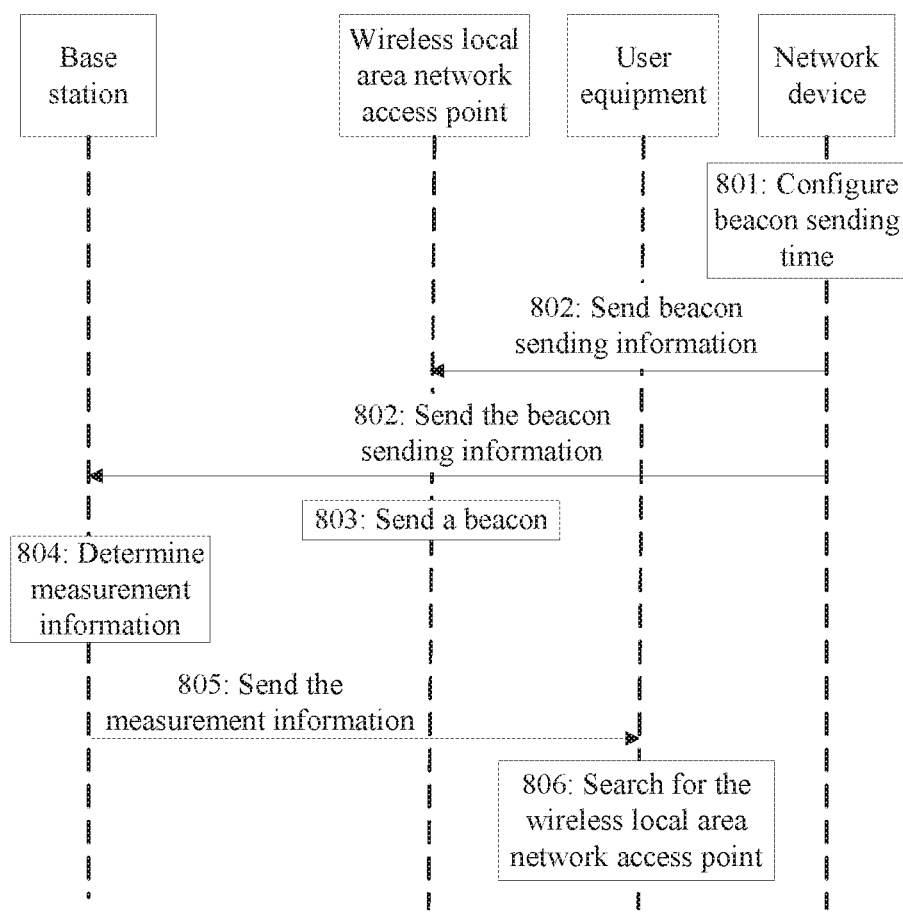
FIG. 9 is a flowchart of another wireless local area network access point search method according to an embodiment of the present application.

The method shown in FIG. 9 includes:

801: A network device configures beacon sending information for a wireless local area network access point.

802: The network device sends the beacon sending information to a base station and the wireless local area network access point.

803: After receiving the beacon sending information, the wireless local area network access point sends a beacon according to the beacon sending information.

804: After receiving the beacon sending information, the base station determines measurement information according to the beacon sending information.

805: The base station sends the measurement information to a user equipment.

806: After receiving the measurement information, the user equipment searches for the wireless local area network access point according to the measurement information.

Figure 10:
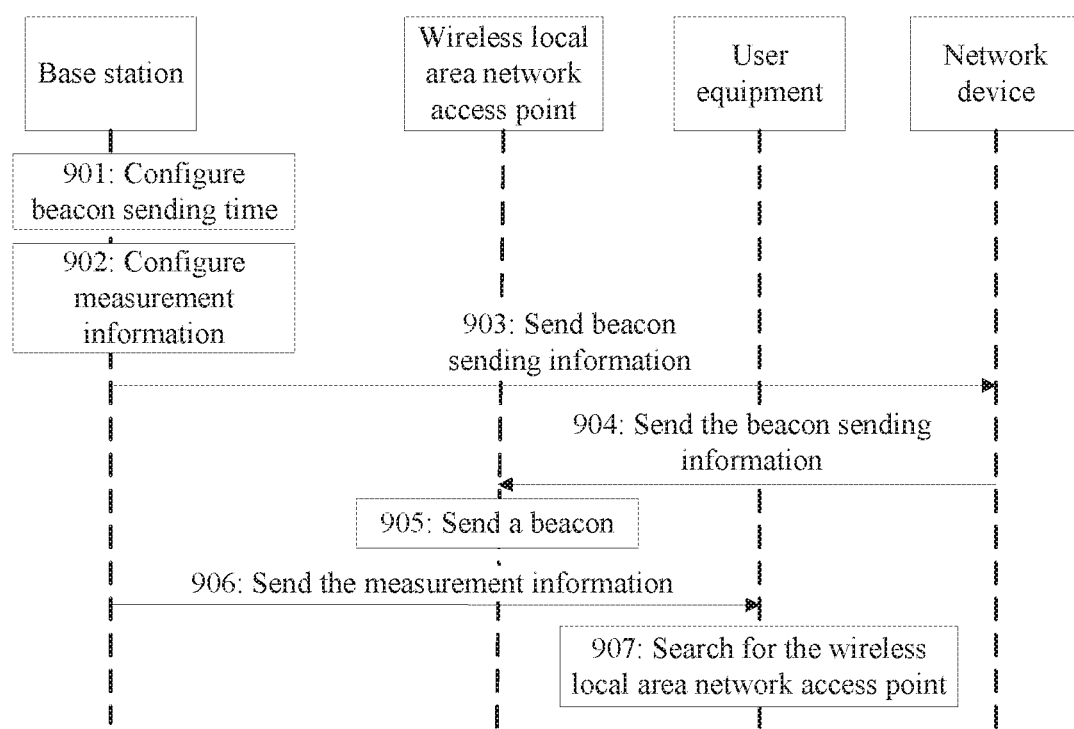
FIG. 10 is a flowchart of another wireless local area network access point search method according to an embodiment of the present application.

The method shown in FIG. 10 includes:

901: A base station configures beacon sending information for a wireless local area network access point.

902: The base station configures measurement information for a user equipment.

903: The base station sends the beacon sending information to a network device.

904: After receiving the beacon sending information, the network device sends the beacon sending information to the wireless local area network access point.

905: After receiving the beacon sending information, the wireless local area network access point sends a beacon according to the beacon sending information.

906: The base station sends the measurement information to the user equipment.

907: After receiving the measurement information, the user equipment searches for the wireless local area network access point according to the measurement information.

Figure 11:
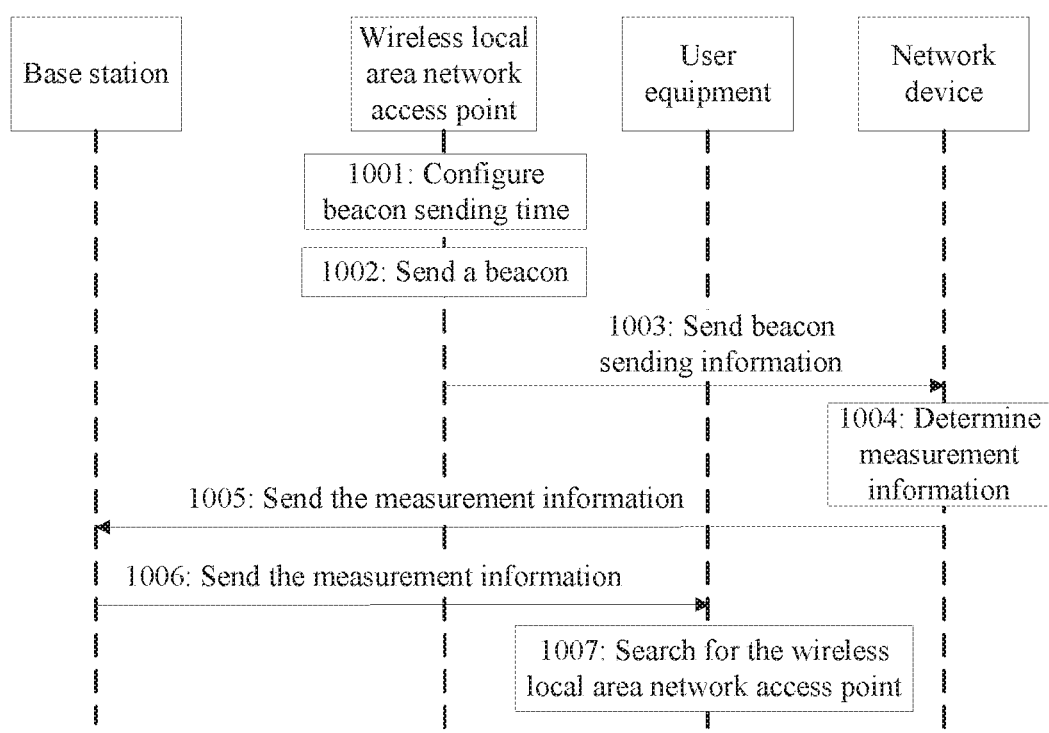
FIG. 11 is a flowchart of another wireless local area network access point search method according to an embodiment of the present application.

The method shown in FIG. 11 includes:

1001: A wireless local area network access point configures beacon sending information for the wireless local area network access point.

1002: The wireless local area network access point sends a beacon according to the beacon sending information.

1003: The wireless local area network access point sends the beacon sending information to a network device.

1004: After receiving the beacon sending information, the network device determines measurement information according to the beacon sending information.

1005: The network device sends the measurement information to a base station.

1006: After receiving the measurement information, the base station sends the measurement information to a user equipment.

1007: After receiving the measurement information, the user equipment searches for the wireless local area network access point according to the measurement information.

Figure 12:
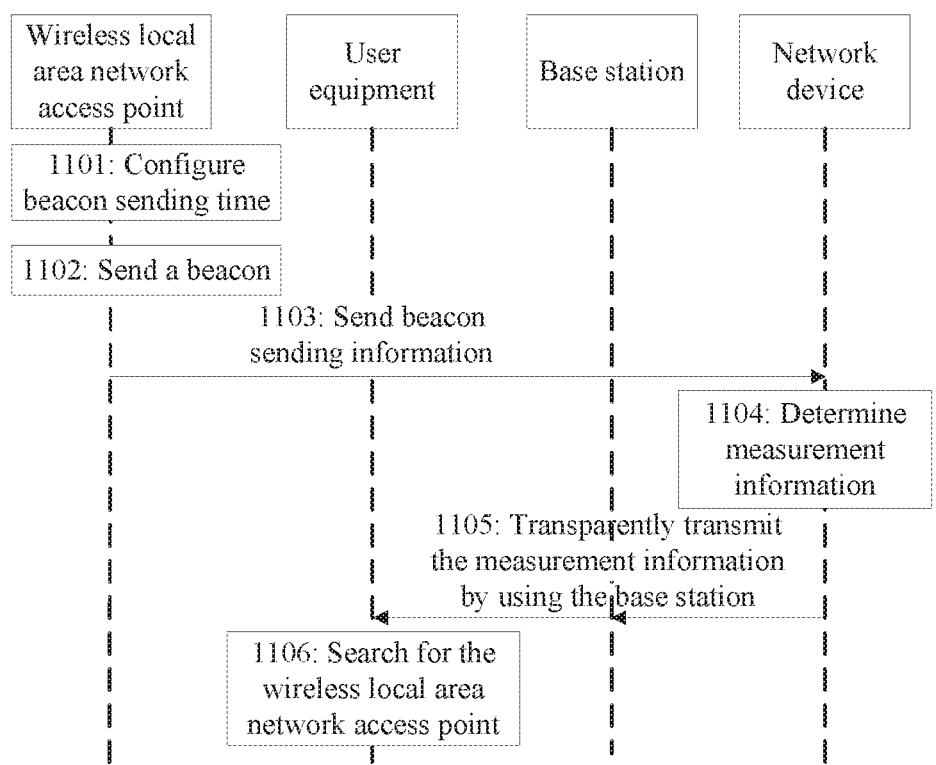
FIG. 12 is a flowchart of another wireless local area network access point search method according to an embodiment of the present application.

The method shown in FIG. 12 includes:

1101: A wireless local area network access point configures beacon sending information for the wireless local area network access point.

1102: The wireless local area network access point sends a beacon according to the beacon sending information.

1103: The wireless local area network access point sends the beacon sending information to a network device.

1104: After receiving the beacon sending information, the network device determines measurement information according to the beacon sending information.

1105: The network device uses a base station to transparently transmit the measurement information to a user equipment.

1106: After receiving the measurement information, the user equipment searches for the wireless local area network access point according to the measurement information.

Figure 13:
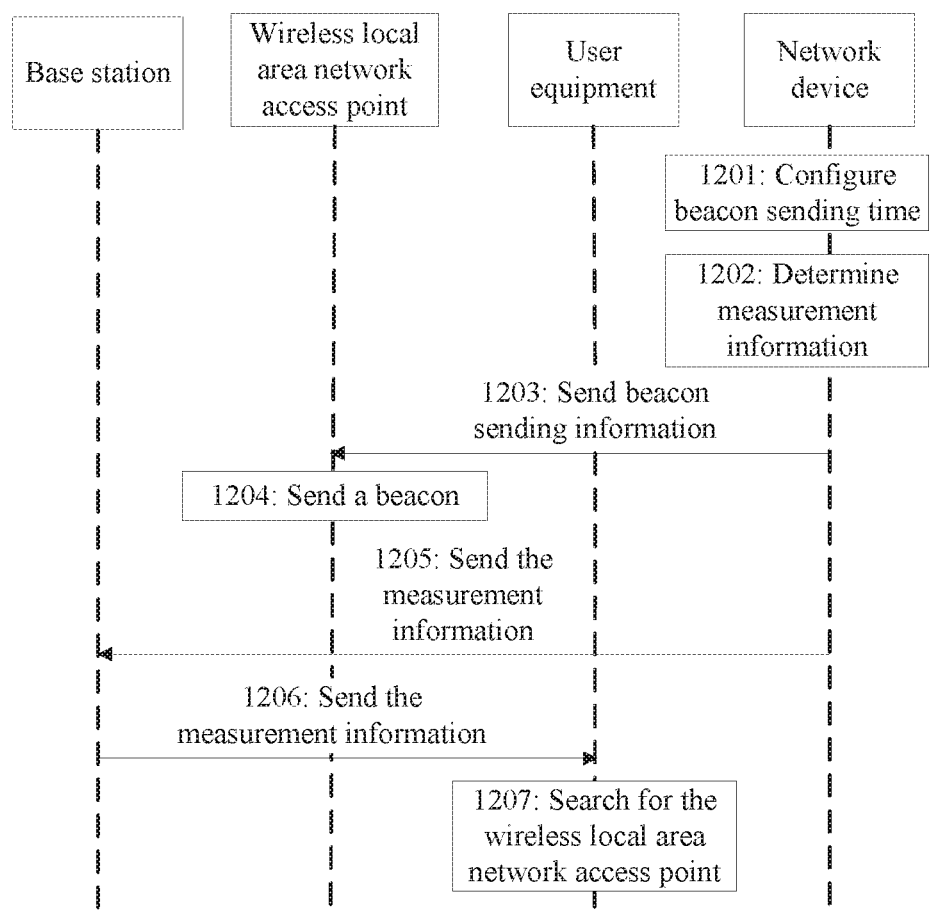
FIG. 13 is a flowchart of another wireless local area network access point search method according to an embodiment of the present application.

The method shown in FIG. 13 includes:

1201: A network device configures beacon sending information for a wireless local area network access point.

1202: The network device configures measurement information for a user equipment.

1203: The network device sends the beacon sending information to the wireless local area network access point.

1204: After receiving the beacon sending information, the wireless local area network access point sends a beacon according to the beacon sending information.

1205: The network device sends the measurement information to a base station.

1206: After receiving the measurement information, the base station sends the measurement information to the user equipment.

1207: After receiving the measurement information, the user equipment searches for the wireless local area network access point according to the measurement information.

Figure 14:
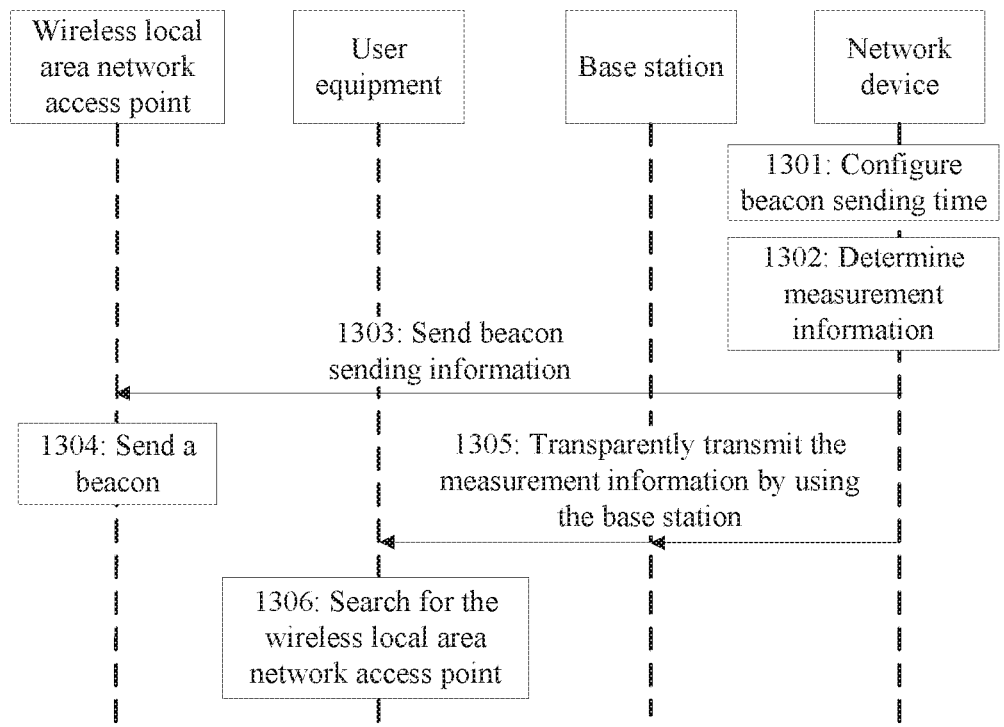
FIG. 14 is a flowchart of another wireless local area network access point search method according to an embodiment of the present application.

The method shown in FIG. 14 includes:

1301: A network device configures beacon sending information for a wireless local area network access point.

1302: The network device configures measurement information for a user equipment.

1303: The network device sends the beacon sending information to the wireless local area network access point.

1304: After receiving the beacon sending information, the wireless local area network access point sends a beacon according to the beacon sending information.

1305: The network device uses the base station to transparently transmit the measurement information to the user equipment.

1306: After receiving the measurement information, the user equipment searches for the wireless local area network access point according to the measurement information.

According to the wireless local area network access point search method provided in the embodiment of the present application, beacon sending information of a wireless local area network access point and measurement information of a user equipment are matched, so that the user equipment can search for the wireless local area network access point only at the time when and a frequency channel number at which the wireless local area network access point sends a beacon. Compared with the prior art in which a user equipment needs to continuously keep a state of searching for a wireless local area network access point, the present application greatly shortens time spent by the user equipment in listening to a beacon, and therefore reduces power consumption for passive scanning.

Figure 15:
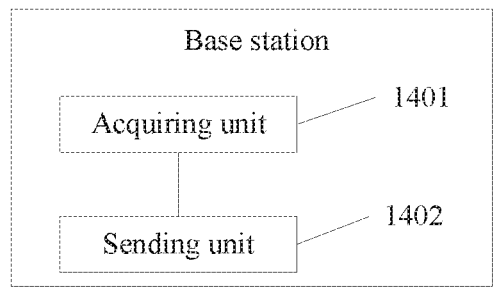
FIG. 15 is a composition block diagram of a base station according to an embodiment of the present application.

The present application provides a base station, which may be configured to implement the method processes on a base station side that are shown in the foregoing FIG. 2 to FIG. 14, and as shown in FIG. 15, includes: an acquiring unit 1401 and a sending unit 1402.

The acquiring unit 1401 is configured to acquire measurement information.

The sending unit 1402 is configured to send the measurement information acquired by the acquiring unit 1401 to a user equipment, where the measurement information is used by the user equipment to search for a wireless local area network access point, and the user equipment is served by the base station.

The measurement information includes at least one of the following information: search time information, beacon sending time information, frequency information of the wireless local area network access point, and identifier information of the wireless local area network access point.

Optionally, the search time information includes search duration, or includes search duration and a search cycle; and the beacon sending time information includes beacon sending time, or includes beacon sending time and a beacon sending cycle.

Optionally, the acquiring unit 1401 is specifically configured to acquire beacon sending information of the wireless local area network access point, and determine the measurement information according to the beacon sending information; or configured to configure the measurement information for the user equipment; or configured to receive the measurement information sent by a network device, where the network device is configured to manage collaborative work between the base station and the wireless local area network access point.

Optionally, the measurement information sent by the network device includes: measurement information configured for the user equipment by the network device, or measurement information that is of the user equipment and determined by the network device according to the beacon sending information of the wireless local area network access point.

Optionally, the acquiring unit 1401 is further configured to configure the beacon sending information for the wireless local area network access point; or further configured to receive the beacon sending information sent by the wireless local area network access point; or further configured to receive the beacon sending information sent by the network device.

Optionally, the beacon sending information sent by the network device includes: beacon sending information sent by the wireless local area network access point to the network device, or beacon sending information configured for the wireless local area network access point by the network device.

Optionally, the sending unit 1402 is further configured to send the beacon sending information to the wireless local area network access point, so that the wireless local area network access point sends a beacon according to the beacon sending information; and further configured to send the beacon sending information to the network device, so that the network device sends the beacon sending information to the wireless local area network access point.

Optionally, the sending unit 1402 is further configured to send the beacon sending information to the wireless local area network access point; or configured to send the beacon sending information to the network device, and the network device sends the beacon sending information to the wireless local area network access point.

Optionally, the beacon sending information includes beacon sending time information, or includes beacon sending time information and frequency information.

Optionally, the sending unit 1402 is further configured to transparently transmit, to the user equipment, the measurement information sent from the network device to the user equipment.

The measurement information transparently transmitted from the network device to the user equipment includes: the measurement information configured for the user equipment by the network device, or the measurement information that is of the user equipment and determined by the network device according to the beacon sending information of the wireless local area network access point.

Optionally, the sending unit 1402 is further configured to send measurement indication information to the user equipment; or configured to transparently transmit, to the user equipment, measurement indication information, sent from the network device to the user equipment, so that the user equipment that receives the measurement indication information searches for the wireless local area network access point according to the stored measurement information.

Figure 16:
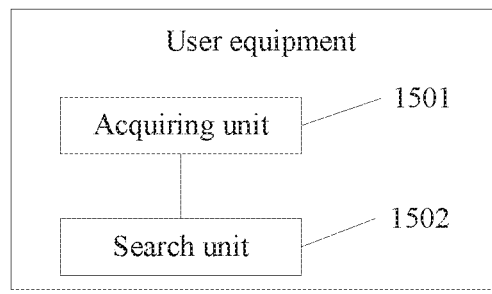
FIG. 16 is a composition block diagram of a user equipment according to an embodiment of the present application.

The present application provides a user equipment, which may be configured to implement the method processes on a user equipment side that are shown in the foregoing FIG. 2 to FIG. 14, and as shown in FIG. 16, includes: an acquiring unit 1501 and a search unit 1502.

The acquiring unit 1501 is configured to acquire measurement information.

The search unit 1502 is configured to search for a wireless local area network access point according to the measurement information acquired by the acquiring unit 1501.

Optionally, the measurement information includes at least one of the following information: search time information, beacon sending time information, frequency information of the wireless local area network access point, and identifier information of the wireless local area network access point.

Optionally, the search time information includes search duration, or includes search duration and a search cycle; and the beacon sending time information includes beacon sending time, or includes beacon sending time and a beacon sending cycle.

Optionally, the acquiring unit 1501 is configured to receive the measurement information sent by a base station; or further configured to receive the measurement information sent by a network device and transparently transmitted by a base station, where the network device is configured to manage collaborative work between the base station and the wireless local area network access point.

Optionally, the search unit 1502 is further configured to: when receiving measurement indication information sent by the base station or receiving measurement information sent from the network device and transparently transmitted by the base station, search for the wireless local area network access point according to the stored measurement information.

Figure 17:
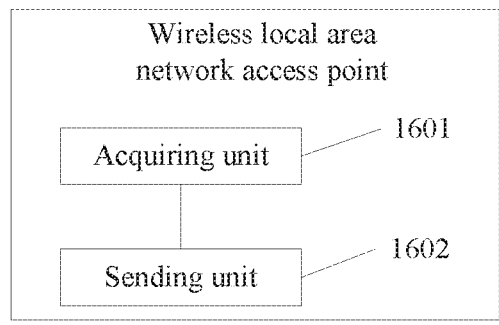
FIG. 17 is a composition block diagram of a wireless local area network access point according to an embodiment of the present application.

The present application provides a wireless local area network access point, which may be configured to implement the method processes on a wireless local area network access point side that are shown in the foregoing FIG. 2 to FIG. 13, and as shown in FIG. 17, includes: an acquiring unit 1601 and a sending unit 1602.

The acquiring unit 1601 is configured to acquire beacon sending information.

The sending unit 1602 is configured to send a beacon according to the beacon sending information acquired by the acquiring unit 1601.

Optionally, the beacon sending information includes beacon sending time information, or includes beacon sending time information and frequency information; and the beacon sending time information includes beacon sending time, or includes beacon sending time and a beacon sending cycle.

Optionally, the acquiring unit 1601 is specifically configured to configure the beacon sending information for the wireless local area network access point; further configured to receive the beacon sending information sent by a base station; and further configured to receive the beacon sending information sent by a network device, where the network device is configured to manage collaborative work between the base station and the wireless local area network access point.

Optionally, the beacon sending information sent by the network device includes: beacon sending information sent by the base station to the network device, or beacon sending information configured for the wireless local area network access point by the network device.

Optionally, the sending unit 1602 is configured to send the beacon sending information to the base station; further configured to send the beacon sending information to the network device, so that the network device sends the beacon sending information to the base station; further configured to send the beacon sending information to the network device, so that the network device determines measurement information according to the beacon sending information, and sends the measurement information to the base station, and the base station sends the measurement information to the user equipment; or configured to send the beacon sending information to the network device, so that the network device determines measurement information according to the beacon sending information, and uses the base station to transparently transmit the measurement information to the user equipment.

Figure 18:
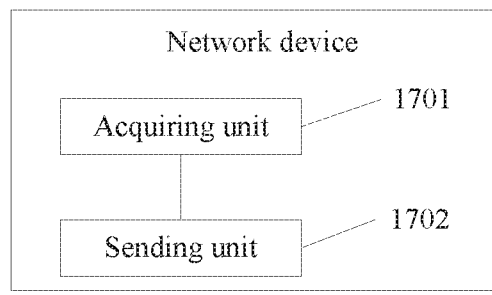
FIG. 18 is a composition block diagram of a network device according to an embodiment of the present application.

The present application provides a network device, which may be configured to implement the method steps on a network device side that are shown in the foregoing FIG. 2 to FIG. 14, and as shown in FIG. 18, includes: an acquiring unit 1701 and a sending unit 1702.

The acquiring unit 1701 is configured to acquire measurement information.

The sending unit 1702 is configured to send the measurement information acquired by the acquiring unit 1701 to a user equipment, where the measurement information is used by the user equipment to search for a wireless local area network access point, and the user equipment is served by a base station managed by the network device.

The measurement information includes at least one of the following information: search time information, beacon sending time information, frequency information of the wireless local area network access point, and identifier information of the wireless local area network access point.

Optionally, the search time information includes search duration, or includes search duration and a search cycle; and the beacon sending time information includes beacon sending time, or includes beacon sending time and a beacon sending cycle.

Optionally, the sending unit 1702 is specifically configured to send the measurement information to the base station, so that the base station sends the measurement information to the user equipment; or further configured to transparently transmit the measurement information to the user equipment by using the base station.

The present application provides a wireless local area network access point search system, which, with reference to the network architecture shown in FIG. 1, may include the base station shown in FIG. 15, the user equipment shown in FIG. 16, the wireless local area network access point shown in FIG. 17, and the network device shown in FIG. 18.

According to the wireless local area network access point search apparatus and system provided in the embodiments of the present application, beacon sending information of a wireless local area network access point and measurement information of a user equipment are matched, so that the user equipment can search for the wireless local area network access point only at the time when and a frequency channel number at which the wireless local area network access point sends a beacon. Compared with the prior art in which a user equipment needs to continuously keep a state of searching for a wireless local area network access point, time spent by the user equipment in listening to a beacon, and therefore reduces power consumption for passive scanning.

Figure 19:
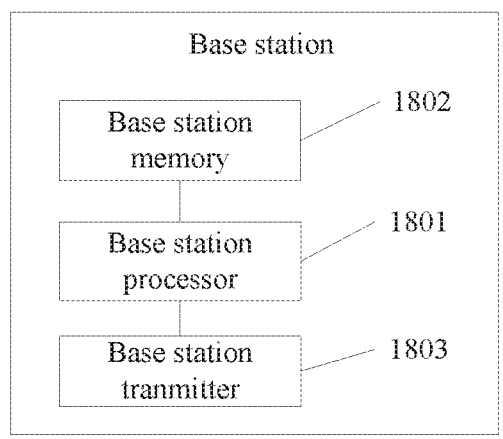
FIG. 19 is a composition block diagram of another base station according to an embodiment of the present application.

The present application provides a base station, which may be configured to implement the method processes on a base station side that are shown in the foregoing FIG. 2 to FIG. 14, and as shown in FIG. 19, includes: a base station processor 1801, a base station memory 1802, and a base station transmitter 1803. The base station memory 1802 is configured to store code, and the base station processor 1801 is configured to read the code stored in the base station memory 1802, so as to implement steps on a base station side in the foregoing method embodiments. The base station processor 1801, the base station memory 1802, and the base station transmitter 1803 communicate by using a bus between devices.

The base station processor 1801 is configured to acquire measurement information.

The base station transmitter 1803 is configured to send the measurement information acquired by the base station processor 1801 to a user equipment, where the measurement information is used by the user equipment to search for a wireless local area network access point, and the user equipment is served by the base station.

The base station memory 1802 is further configured to store the measurement information.

The measurement information includes at least one of the following information: search time information, beacon sending time information, frequency information of the wireless local area network access point, and identifier information of the wireless local area network access point.

Optionally, the search time information includes search duration, or includes search duration and a search cycle; and the beacon sending time information includes beacon sending time, or includes beacon sending time and a beacon sending cycle.

Optionally, the base station processor 1801 is specifically configured to acquire beacon sending information of the wireless local area network access point, and determine the measurement information according to the beacon sending information; or configured to configure the measurement information for the user equipment; or configured to receive the measurement information sent by a network device, where the network device is configured to manage collaborative work between the base station and the wireless local area network access point.

The measurement information sent by the network device includes: measurement information configured for the user equipment by the network device, or measurement information that is of the user equipment and determined by the network device according to the beacon sending information of the wireless local area network access point.

Optionally, the base station processor 1801 is further configured to configure beacon sending information for the wireless local area network access point; further configured to receive beacon sending information sent by the wireless local area network access point; and further configured to receive beacon sending information sent by the network device.

The base station memory 1802 is further configured to store the beacon sending information.

The beacon sending information sent by the network device includes: beacon sending information sent by the wireless local area network access point to the network device, or beacon sending information configured for the wireless local area network access point by the network device.

Optionally, the base station transmitter 1803 is further configured to send the beacon sending information to the wireless local area network access point, so that the wireless local area network access point sends a beacon according to the beacon sending information.

Optionally, the base station transmitter 1803 is further configured to send the beacon sending information to the wireless local area network access point; and further configured to send the beacon sending information to the network device, and the network device sends the beacon sending information to the wireless local area network access point.

Optionally, the beacon sending information includes beacon sending time information, or includes beacon sending time information and frequency information.

Optionally, the base station transmitter 1803 is further configured to transparently transmit, to the user equipment, the measurement information sent from the network device to the user equipment.

The measurement information transparently transmitted from the network device to the user equipment includes: the measurement information configured for the user equipment by the network device, or the measurement information that is of the user equipment and determined by the network device according to the beacon sending information of the wireless local area network access point.

Optionally, the base station transmitter 1803 is further configured to send measurement indication information to the user equipment; or configured to transparently transmit, to the user equipment, measurement indication information sent by a network device to the user equipment, so that the user equipment that receives the measurement indication information searches for the wireless local area network access point according to the stored measurement information.

Figure 20:
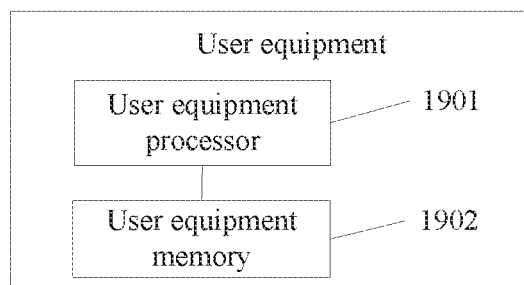
FIG. 20 is a composition block diagram of another user equipment according to an embodiment of the present application.

The present application provides a user equipment, which may be configured to implement the method processes on a user equipment side that are shown in the foregoing FIG. 2 to FIG. 14, and as shown in FIG. 20, includes: a user equipment processor 1901 and a user equipment memory 1902. The user equipment memory 1902 is configured to store code, and the user equipment processor 1901 is configured to read the code stored in the user equipment memory 1902, so as to implement steps on a user equipment side in the foregoing method embodiments. The user equipment processor 1901 and the user equipment memory 1902 communicate by using a bus between devices.

The user equipment processor 1901 is configured to acquire measurement information; and search for a wireless local area network access point according to the measurement information.

The user equipment memory 1902 is configured to store the measurement information.

Optionally, the measurement information includes at least one of the following information: search time information, beacon sending time information, frequency information of the wireless local area network access point, and identifier information of the wireless local area network access point.

Optionally, the search time information includes search duration, or includes search duration and a search cycle; and the beacon sending time information includes beacon sending time, or includes beacon sending time and a beacon sending cycle.

Optionally, the user equipment processor 1901 is configured to receive the measurement information sent by a base station; or further configured to receive the measurement information sent by a network device and transparently transmitted by a base station, where the network device is configured to manage collaborative work between the base station and the wireless local area network access point.

Optionally, the user equipment processor 1901 is further configured to: when receiving measurement indication information sent by the base station or receiving the measurement information sent from the network device and transparently transmitted by the base station, search for the wireless local area network access point according to the stored measurement information.

Figure 21:
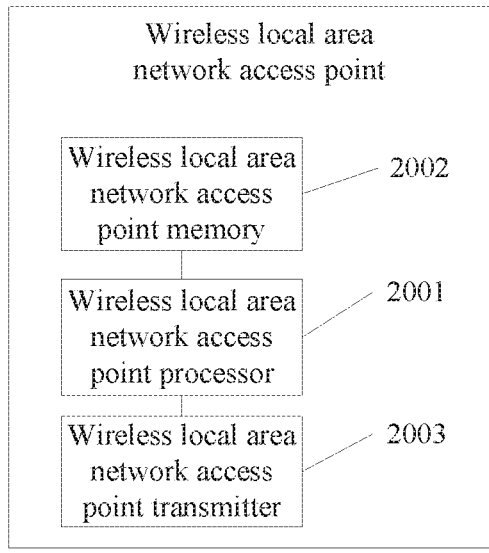
FIG. 21 is a composition block diagram of another wireless local area network access point according to an embodiment of the present application.

The present application provides a wireless local area network access point, which may be configured to implement the method processes on a wireless local area network access point side that are shown in the foregoing FIG. 2 to FIG. 14, and as shown in FIG. 21, includes: a wireless local area network access point processor 2001, a wireless local area network access point memory 2002, and a wireless local area network access point transmitter 2003. The wireless local area network access point memory 2002 is configured to store code, and the wireless local area network access point processor 2001 is configured to read the code stored by the wireless local area network access point memory 2002, so as to implement steps on a wireless local area network access point side in the foregoing method embodiments. The wireless local area network access point processor 2001, the wireless local area network access point memory 2002, and the wireless local area network access point transmitter 2003 communicate by using a bus between devices.

The wireless local area network access point processor 2001 is configured to acquire beacon sending information.

The wireless local area network access point transmitter 2003 is configured to send a beacon according to the beacon sending information acquired by the wireless local area network access point processor 2001.

The wireless local area network access point memory 2002 is configured to store the beacon sending information.

Optionally, the beacon sending information includes beacon sending time information, or includes beacon sending time information and frequency information; and the beacon sending time information includes beacon sending time, or includes beacon sending time and a beacon sending cycle.

Optionally, the wireless local area network access point processor 2001 is specifically configured to configure the beacon sending information for the wireless local area network access point; further configured to receive the beacon sending information sent by a base station; and further configured to receive the beacon sending information sent by a network device, where the network device is configured to manage collaborative work between the base station and the wireless local area network access point.

The beacon sending information sent by the network device includes: beacon sending information sent by the base station to the network device, or beacon sending information configured for the wireless local area network access point by the network device.

Optionally, the wireless local area network access point transmitter 2003 is configured to send the beacon sending information to the base station; further configured to send the beacon sending information to the network device, so that the network device sends the beacon sending information to the base station; further configured to send the beacon sending information to the network device, so that the network device determines measurement information according to the beacon sending information, and sends the measurement information to the base station, and the base station sends the measurement information to the user equipment; or configured to send the beacon sending information to the network device, so that the network device determines measurement information according to the beacon sending information, and uses the base station to transparently transmit the measurement information to the user equipment.

Figure 22:
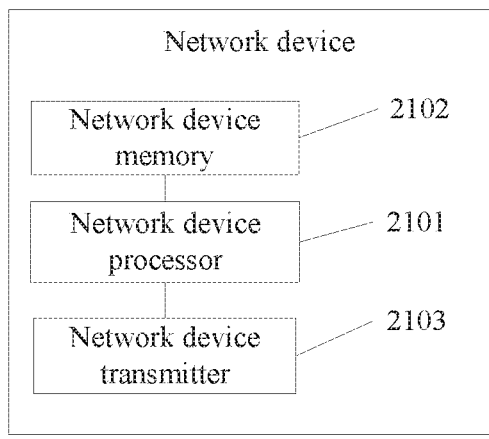
FIG. 22 is a composition block diagram of another network device according to an embodiment of the present application.

The present application provides a network device, which may be configured to implement the method processes on a network device side that are shown in the foregoing FIG. 2 to FIG. 14 and as shown in FIG. 22, includes: a network device processor 2101, a network device memory 2102, and a network device transmitter 2103. The network device memory 2102 is configured to store code, and the network device processor 2101 is configured to read the code stored in the network device memory 2102, so as to implement steps on a network device side in the foregoing method embodiments. The network device processor 2101, the network device memory 2102, and the network device transmitter 2103 communicate by using a bus between devices.

The network device processor 2101 is configured to acquire measurement information.

The network device transmitter 2103 is configured to send the measurement information acquired by the network device processor 2101 to a user equipment, where the measurement information is used by the user equipment to search for a wireless local area network access point, and the user equipment is served by a base station managed by the network device.

The measurement information includes at least one of the following information: search time information, beacon sending time information, frequency information of the wireless local area network access point, and identifier information of the wireless local area network access point.

Optionally, the search time information includes search duration, or includes search duration and a search cycle; and the beacon sending time information includes beacon sending time, or includes beacon sending time and a beacon sending cycle.

Optionally, the network device transmitter 2103 is specifically configured to send the measurement information to the base station, so that the base station sends the measurement information to the user equipment; or further configured to transparently transmit the measurement information to the user equipment by using the base station.

According to the wireless local area network access point search apparatus provided in the embodiments of the present application, beacon sending information of a wireless local area network access point and measurement information of a user equipment are matched, so that the user equipment can search for the wireless local area network access point only at the time when and a frequency channel number at which the wireless local area network access point sends a beacon. Compared with the prior art in which a user equipment needs to continuously keep a state of searching for a wireless local area network access point, the present application greatly shortens time spent by the user equipment in listening to a beacon, and therefore reduces power consumption for passive scanning.

Based on the foregoing descriptions of the implementation manners, a person skilled in the art may clearly understand that the present application may be implemented by software in addition to necessary universal hardware or by hardware only. In most circumstances, the former is a preferred implementation manner. Based on such an understanding, the technical solutions of the present application essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present application.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method, comprising:
acquiring, by a user equipment, measurement information, wherein the measurement information comprises at least one of the following information: search time information, beacon sending time information, frequency information of a wireless local area network access point, or identifier information of the wireless local area network access point, wherein the search time information comprises search duration, or comprises search duration and a search cycle; and
searching, by the user equipment, for the wireless local area network access point according to the measurement information,
wherein when the measurement information is beacon sending information, the beacon sending information and the measurement information are matched.

2. The method according to claim 1, wherein the beacon sending time information comprises beacon sending time, or comprises beacon sending time and a beacon sending cycle.

3. The method according to claim 1, wherein the acquiring, by the user equipment, measurement information comprises:
receiving, by the user equipment, the measurement information from a base station.

4. The method according to claim 1, wherein the acquiring, by the user equipment, measurement information comprises:
receiving, by the user equipment, the measurement information sent from a network device and transparently transmitted by a base station, wherein the network device is configured to manage collaborative work between the base station and the wireless local area network access point.

5. The method according to claim 1, further comprising:
when receiving measurement indication information from the base station or receiving the measurement information sent from the network device and transparently transmitted by the base station, searching, by the user equipment, for the wireless local area network access point according to stored measurement information.

6. The method according to claim 1, wherein when the search time information comprises search duration and a search cycle, searching, by the user equipment, for the wireless local area network access point according to the measurement information comprises:

searching, by the user equipment, for a wireless local area network access point in the search duration of each search cycle.

7. The method according to claim 2, wherein the user equipment searches for the wireless local area network access point only during a beacon sending time.

8. A user equipment, comprising: a memory storing a program to be executed in a processor, wherein the program comprises instructions that cause the user equipment to perform the following:
acquiring measurement information, wherein the measurement information comprises at least one of the following information: search time information, beacon sending time information, frequency information of a wireless local area network access point, and identifier information of the wireless local area network access point, wherein the search time information comprises search duration, or comprises search duration and a search cycle; and
searching for the wireless local area network access point according to the measurement information,
wherein when the measurement information is beacon sending information, the beacon sending information and the measurement information are matched.

9. The user equipment according to claim 8, wherein the beacon sending time information comprises beacon sending time, or comprises beacon sending time and a beacon sending cycle.

10. The user equipment according to claim 8, further comprising a receiver, wherein
the receiver is configured to t receive the measurement information sent by a base station.

11. The user equipment according to claim 8, further comprising a receiver, wherein
the receiver is configured to receive the measurement information sent from a network device and transparently transmitted by a base station, wherein the network device is configured to manage collaborative work between the base station and the wireless local area network access point.

12. The user equipment according to claim 8, wherein when the user equipment receives measurement indication information from the base station or the measurement information sent from the network device and transparently transmitted by the base station, the memory further comprises instructions that, when executed by the processor, cause the user equipment to: search for the wireless local area network access point according to stored measurement information.

13. The user equipment according to claim 8, wherein when the search time information comprises search duration and a search cycle, the searching for the wireless local area network access point according to the measurement information comprises:
searching for a wireless local area network access point in the search duration of each search cycle.

14. A non-transitory processor-readable medium having processor-executable instructions stored thereon for a user equipment, the processor-executable instructions, when executed by a processor, facilitating performance of the following:
acquiring measurement information, wherein the measurement information comprises at least one of the following information: search time information, beacon sending time information, frequency information of a wireless local area network access point, or identifier information of the wireless local area network access point, wherein the search time information comprises search duration, or comprises search duration and a search cycle; and
searching for the wireless local area network access point according to the measurement information,
wherein when the measurement information is beacon sending information, the beacon sending information and the measurement information are matched.

15. The medium according to claim 14, wherein the beacon sending time information comprises beacon sending time, or comprises beacon sending time and a beacon sending cycle.

16. The medium according to claim 14, wherein the processor is caused to:
receive the measurement information from a base station.

17. The medium according to claim 14, wherein the processor is caused to:
receive the measurement information sent from a network device and transparently transmitted by a base station, wherein the network device is configured to manage collaborative work between the base station and the wireless local area network access point.

18. The medium according to claim 14, further comprising instructions that cause the processor to execute:
when receiving measurement indication information from the base station or receiving the measurement information sent from the network device and transparently transmitted by the base station, searching for the wireless local area network access point according to stored measurement information.

19. The medium according to claim 14, wherein when the search time information comprises search duration and a search cycle, the processor is caused to:
search for a wireless local area network access point in the search duration of each search cycle.

* * * * *